Figure 1:
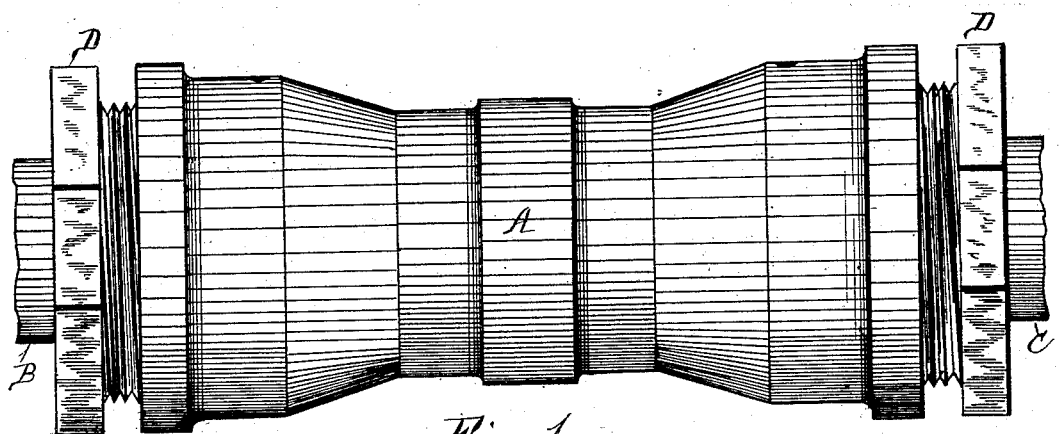

(No Model.)

R. B. COGAN.
PIPE COUPLING.

No. 318,356. Patented May 19, 1885.

Witnesses
A. A. Connolly
J. C. Wildman

Inventor
Robert B. Cogan
By
Connolly Bros & McTighe
Att'ys

UNITED STATES PATENT OFFICE.

ROBERT B. COGAN, OF BRADDOCK, PENNSYLVANIA, ASSIGNOR OF TWO-THIRDS TO SIMON C. COLLIN AND JOHN RINARD, OF SAME PLACE.

PIPE-COUPLING.

SPECIFICATION forming part of Letters Patent No. 318,356, dated May 19, 1885.

Application filed March 14, 1885. (No model.)

*To all whom it may concern:*

Be it known that I, ROBERT B. COGAN, of Braddock, in the county of Allegheny and State of Pennsylvania, have invented certain new and useful Improvements in Pipe-Couplings; and I do hereby declare that the following is a full, clear, and exact description of the invention, which will enable others skilled in the art to which it appertains to make and use the same, reference being had to the accompanying drawings, which form a part of this specification.

This invention has relation to improvements in joints and couplings for metallic pipes, but is especially adapted for use upon conduits employed in the conveyance of natural gas.

Heretofore various devices have been employed in joining pipes of this class, such as the screw-and-collar joint, and the plain collar with a packing of lead or other similar material, and have to a certain extent been successful; but after the pipes have been laid for a short time excessive heat or cold causes the pipes to expand or contract and the perfectness of the joint is injured, and in some cases broken, often causing disastrous results to both life and property.

The object of my invention is to provide a joint of such a form and construction that it shall not alone be air-tight when first applied, but shall continue so, notwithstanding the changes in the pipe caused by the variation of the temperature and alignment. I accomplish this object by employing a joint of the form and construction as illustrated in the drawings, and hereinafter more fully described and claimed.

Figure 2:
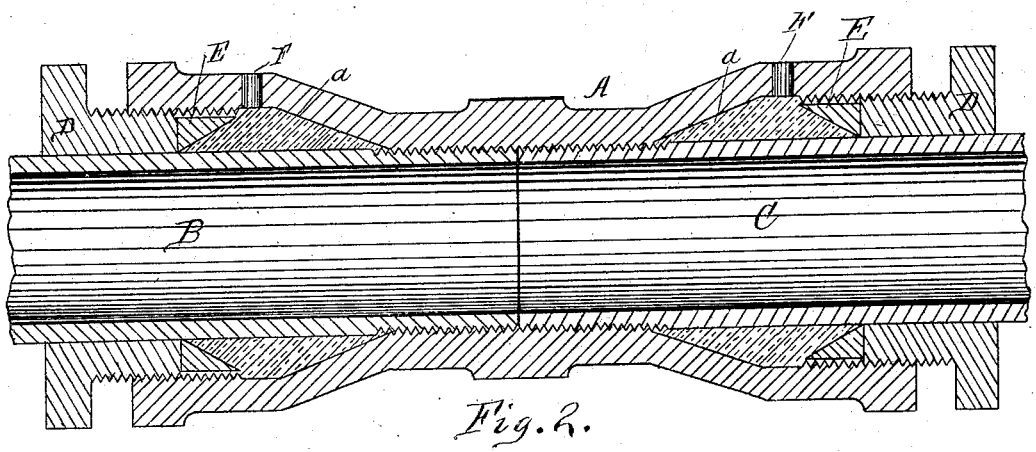

Referring to the accompanying drawings, Figure 1 is an exterior view, and Fig. 2 a longitudinal section, of my improved joint.

A represents the collar, which is screw-threaded at its central portion, and adapted to receive the pipes B C, which are to be joined. The outer extremities of this collar are considerably enlarged, forming sleeves or recesses *a a*, which are also screw-threaded and adapted to receive the externally-screw-threaded follower or nut D. Within the sleeves or recesses *a a* are placed loose washers E E, whose inner surface is conical, so as to form a circular wedge, as shown.

F F represent pouring-holes, which may be left open or closed with any suitable cap or cover.

The operation is as follows: The two pipes B C which are to be joined are firmly screwed into the threaded inner or contracted portion of the collar A. The loose washers E E are placed within the recesses *a a*, and the follower D partially screwed in the recesses *a*. If a metallic packing is to be used, the metal is now run into the recesses *a a* through the pouring-holes *b b* until said recesses are completely filled, and when cooled sufficiently the same may be more firmly packed around the pipe through the medium of the loose washer E and the screw-threaded follower D.

As will be seen at a glance, the shape of the washer E, when being forced up by the follower D, will force the packing in and down upon the pipe; or, if deemed desirable, a fibrous packing—such as hemp, &c.—may be employed. It is inserted before the follower and washer, and when placed in position the follower D is screwed tight, and the same result accomplished as in the case of the metallic packing.

To assist the compression of the packing, the collar A is formed with its expanding portions *a* inclined outwardly. This and the inclined washer then combine to force the packing tightly against the pipe.

Having described my invention, I claim—

1. In a pipe-coupling, the combination, with the internally-threaded collar A, adapted to receive the threaded pipe-sections, and having the enlarged and chambered ends *a*, also internally threaded, of the collars E, having their inner surfaces inclined, the threaded followers D, adapted to screw into the enlargements *a*, and a suitable packing, substantially as described.

2. The improved pipe-coupling consisting of the internally-threaded collar A, adapted to receive the threaded pipe-sections, and having the enlarged and chambered ends $a$, also internally threaded and formed conical between the inner and outer threaded portions, in combination with the collars E, having their inner surfaces inclined, threaded followers D, adapted to screw into the enlargements $a$, and a suitable packing, substantially as described.

In testimony that I claim the foregoing as my own I have hereto affixed my signature in presence of two witnesses.

ROBERT B. COGAN.

Witnesses:
  A. A. CONNOLLY,
  JOS. B. CONNOLLY.